J. A. MARTIN.
HOG WATERER.
APPLICATION FILED MAR. 10, 1920.
1,365,260.
Patented Jan. 11, 1921.
2 SHEETS—SHEET 1.
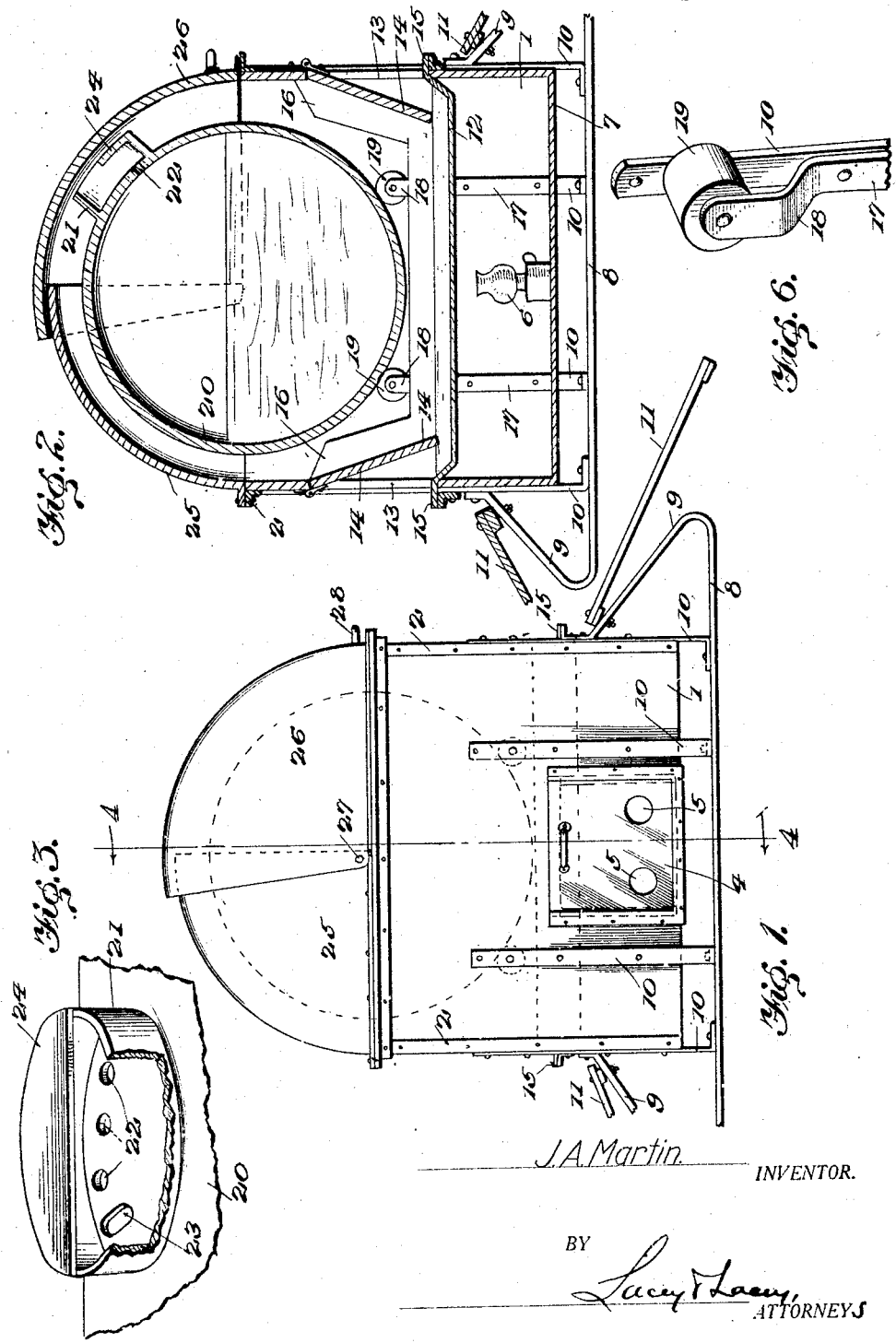
J. A. Martin
INVENTOR.
BY
*Lacey & Lacey,*
ATTORNEYS

J. A. MARTIN.
HOG WATERER.
APPLICATION FILED MAR. 10, 1920.

1,365,260.

Patented Jan. 11, 1921.
2 SHEETS—SHEET 2.

J. A. Martin, INVENTOR.

BY Lacey & Lacey, ATTORNEYS

UNITED STATES PATENT OFFICE.

JAMES A. MARTIN, OF GALESBURG, ILLINOIS, ASSIGNOR TO MARTIN METAL PRODUCTS COMPANY, OF GALESBURG, ILLINOIS, A CORPORATION OF ILLINOIS.

HOG-WATERER.

1,365,260.  Specification of Letters Patent.  Patented Jan. 11, 1921.

Application filed March 10, 1920. Serial No. 364,652.

*To all whom it may concern:*

Be it known that I, JAMES A. MARTIN, a citizen of the United States, residing at Galesburg, in the county of Knox and State of Illinois, have invented certain new and useful Improvements in Hog-Waterers, of which the following is a specification.

This invention is an apparatus for watering hogs and other small live stock and has for its object the provision of a device which may be readily moved from place to place; which will give the animals ready access to the water when thirsty, and by which the supply of water may be readily replenished and waste of the water prevented. These several stated objects, and other objects which will incidentally appear in the course of the following description, are attained in such a device as is illustrated in the accompanying drawings, and the invention resides in certain novel features which will be particularly pointed out in the claims following the description.

In the drawings—

Figure 1 is a side elevation of an apparatus embodying my improvements;

Fig. 2 is a longitudinal section of the same;

Fig. 3 is a detail of the spout;

Fig. 6 is a detail perspective view of one of the roller supports for the drum.

Figure 4:
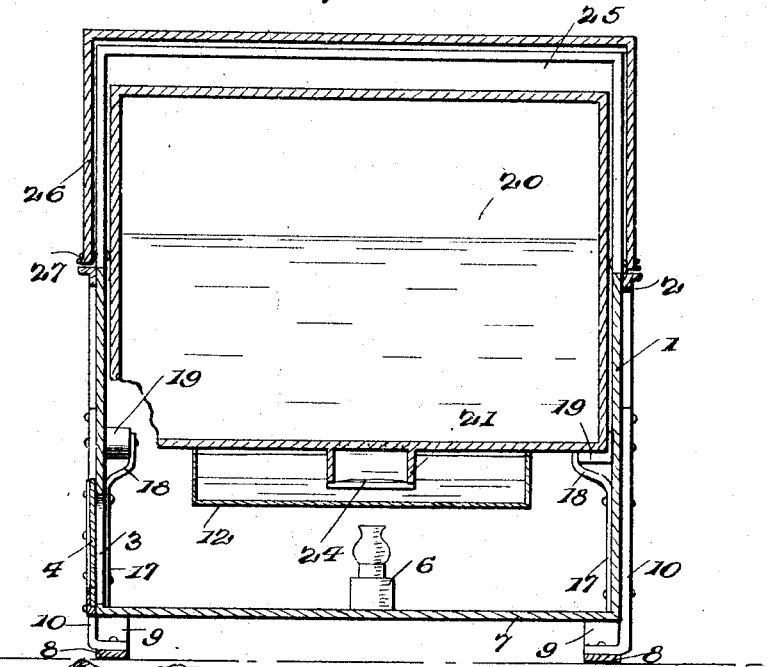
Fig. 4 is a transverse section on the line 4—4 of Fig. 1.
Figure 5:
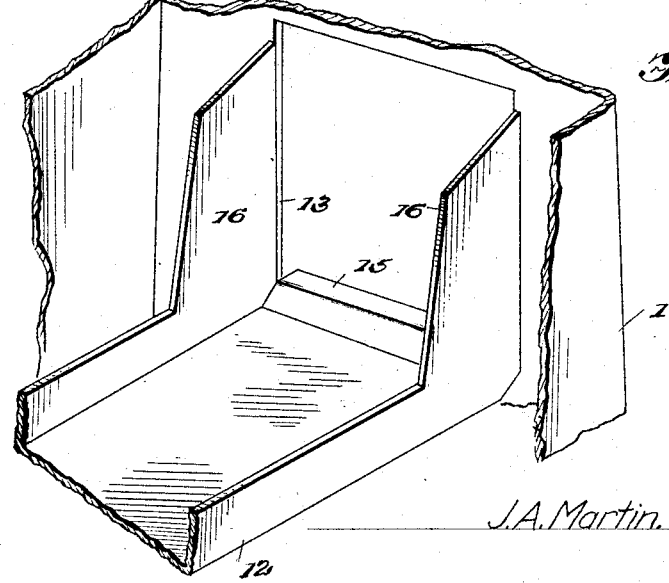
Fig. 5 is an enlarged detail perspective of one end of the trough.

In carrying out my invention, I employ a casing 1 which is constructed of sheet metal and may be reinforced at its corners by angle bars 2, although the angle bars may be omitted if the metal employed be of heavy gage. This casing is preferably rectangular in form and may be of any desired dimensions. In one side of the casing is an opening 3 which is normally closed by a vertically slidable door or gate 4 having openings 5 in its lower edge to permit the access of air to the interior of the casing so as to support combustion in a lamp or heater 6 which may be inserted into or removed from the casing through the opening 3 as will be readily understood. The bottom 7 of the casing forms a shelf or support for the said lamp or heater and is out of contact with the ground, being carried by runners 8. The extremities of the runners are turned upwardly, as shown at 9, and secured to the end walls of the casing so that the device may be readily drawn over the ground in either direction. Standards 10 are secured to the walls of the casing and have their lower ends extended below the bottom thereof and secured to the runners so that the casing will be firmly supported in spaced relation to the surface of the ground. The upturned portions 9 of the runners immediately adjacent the end of the casing are provided with suitable bolt-receiving openings so that said upturned portions may be made to support a platform or runway 11 up which the animals may walk to reach the drinking trough.

Extending between the end walls of the casing is a trough 12 and in each end wall immediately above the ends of the trough, I provide an opening 13 through which the animal may insert his head to drink from the trough. A door or guard 14 is hingedly mounted at its upper end upon the end wall of the casing and normally the weight of the door will hold it lowered so as to close the opening 13 and thereby prevent the entrance of dirt and dust to the water. When the animal, however, desiring to drink, places his head against the door, the door will readily yield so that access to the water may be had. The trough may be supported in the casing in any convenient or preferred manner and is shown as provided at its ends with lips 15 extending through the openings 13 and resting on the bottoms of said openings. Shields 16 rise from the sides of the trough, at the ends thereof, so that splashing of the water over the sides of the trough by the drinking animal will be prevented. By referring to Fig. 2, it will be readily noted that these shields coact with the doors 14 to form drinking compartments which will permit the animal to quench his thirst but will prevent waste of the water.

Within the casing, against the side walls and in the vertical planes of the standards 10, I secure standards or brackets 17 the upper ends of which are offset, as at 18. The members 10 and 17 are secured to the casing by the same rivets and serve to reinforce the casing walls and prevent buckling thereof. The offsets 18 accommodate rollers 19 which are rotatably mounted in the upper extremities of the offsets and the adjacent walls, and a drum or tank 20 rests upon and is carried by said rollers. This tank or drum is closed at both ends and throughout its peripheral surface or wall except at one point where a spout or nozzle 21 is formed to project radially, openings 22 and a slot 23 being formed through the peripheral wall of the casing within the area defined by the inner end of the spout. The outer end of the spout is partly closed by a lip 24 which projects over the said slot and openings. When the drum or tank is in the position shown in Fig. 2, water may be readily poured through the spout into the drum to fill the same, the water flowing through the openings 22 and air escaping through the slot 23 as the water rises in the drum. After the drum has been filled, it is rotated in the direction of the arrow in Fig. 2 so that the nozzle or spout will project into the trough 12, as shown in Fig. 4, and will permit water to escape into the trough until the level of the water therein passes above the lower end of the spout whereupon the spout or nozzle will be sealed and further flow of water will be cut off. As the animals drink, however, the flow will be again set up, and consequently, a constant supply in the trough will be maintained. It will be readily understood that as the direction of rotation of the drum is toward the lip 24 the escape of water from the drum will be prevented until the nozzle has reached or nearly reached its lowest position and, consequently, there will be no waste of water.

To prevent the access of dust through the top of the casing and also to prevent escape of the heated air within the casing, I provide a cover consisting of a stationary portion 25 which is secured rigidly to the lower casing. The forward portion of the casing is covered by a swinging member 26 pivotally mounted at 27 upon the rigid member and of a radius which will permit it to be swung backwardly over the stationary member to permit access to the drum through the spout 21 as will be readily understood upon reference to Fig. 2. The movable member 26 is provided with a handle 28 to facilitate its manipulation and it may be arranged to swing under the stationary member if preferred.

The tank or drum, it will be noted, has no axle but is supported by rollers so that it may be easily turned about its own longitudinal axis when it is necessary to replenish the water supply or when it is to be returned to its operative position after being filled and it may be easily withdrawn when necessary inasmuch as if the bolts or rivets securing the cover to the lower portion of the casing be removed, the cover may be lifted off the casing and the drum then obviously lifted from its supports.

The operation of the device is thought to be evident from the foregoing description, taken in connection with the accompanying drawings, and it will be readily noted that the device is exceedingly simple in its construction and is not apt to get out of order.

Having thus described the invention, what is claimed as new is:

1. A device for the purpose set forth comprising a casing, standards secured to and bracing the casing and depending below the same, runners secured to the lower extremities of the standards and projecting beyond the ends of the casing and having their extremities turned up and secured to the ends of the casing, a trough supported within the casing, and a runway supported by the runners at the end of the casing whereby drinking animals may reach the trough.

2. A device for the purpose set forth comprising a casing, standards secured to the outer sides of the casing and depending below the same, other standards secured to the inner sides of the casing in the vertical planes of the outer standards, the inner standards having their upper ends offset, rollers mounted between the said offset ends and the adjacent walls of the casing, and a drum resting on said rollers.

In testimony whereof I affix my signature.

JAMES A. MARTIN. [L. S.]